United States Patent [19]
Goad

[11] Patent Number: 5,563,780
[45] Date of Patent: Oct. 8, 1996

[54] POWER CONVERSION ARRAY APPLYING SMALL SEQUENTIALLY SWITCHED CONVERTERS IN PARALLEL

[75] Inventor: Stephen D. Goad, Tucson, Ariz.

[73] Assignee: International Power Systems, Inc., Tucson, Ariz.

[21] Appl. No.: 164,097

[22] Filed: Dec. 8, 1993

[51] Int. Cl.$^6$ .................................................. H02M 3/00
[52] U.S. Cl. ................................. 363/71; 363/20; 363/40; 307/82
[58] Field of Search ........................... 363/65, 71, 20, 363/21, 39, 40; 323/271, 272; 307/82

[56] References Cited

U.S. PATENT DOCUMENTS

| 3,978,393 | 8/1976 | Wisner et al. | 323/17 |
| 3,984,799 | 10/1976 | Fletcher et al. | 321/2 |
| 4,020,408 | 4/1977 | Grant | 321/2 |
| 4,031,453 | 6/1977 | Teuling | 321/2 |
| 4,062,057 | 12/1977 | Perkins et al. | 363/71 |
| 4,063,307 | 12/1977 | Stephens | 363/21 |
| 4,195,333 | 3/1980 | Hedel | 363/21 |
| 4,290,101 | 9/1981 | Hergenhan | 363/65 |
| 4,685,039 | 8/1987 | Inou et al. | 363/16 |
| 4,695,933 | 9/1987 | Nguyen et al. | 363/17 |
| 4,814,963 | 3/1989 | Petersen | 363/20 |
| 4,814,965 | 3/1989 | Petersen | 363/65 |
| 4,972,292 | 11/1990 | Petersen | 361/56 |
| 5,088,017 | 2/1992 | Yaginuma et al. | 363/21 |
| 5,105,351 | 4/1992 | Harada et al. | 363/65 |
| 5,309,344 | 5/1994 | Smith | 363/20 |
| 5,311,419 | 5/1994 | Shires | 363/65 |
| 5,369,564 | 11/1994 | Choi | 363/71 |
| 5,428,523 | 6/1995 | McDonnal | 363/71 |

Primary Examiner—Peter S. Wong
Assistant Examiner—Adolf Berhane
Attorney, Agent, or Firm—Duane, Morris & Heckscher

[57] ABSTRACT

Decreased input and output ripple current and ripple voltage on a switched mode power conversion array is realized at high power levels and frequencies by coupling an input power signal across an input capacitance to which a plurality of smaller power converter circuits are coupled in parallel. The converter circuits may have any topology now known or later devised. Each of the converter circuits are sequentially operated in a phase shifted manner across the period of the conversion frequency in a time overlapping relationship. For example, if there are N converters and the period of the conversion frequency is T, each converter circuit is triggered or switched at a phase shift corresponding to a time increment of T/N delayed with respect to the preceding or subsequent converter. The output of each of the converters is then coupled in parallel to an output capacitance. The operation of the converters may each be regulated in any manner now known or later devised and are shown in the illustrated embodiment as being pulse width modulated to provide a regulated output.

8 Claims, 8 Drawing Sheets

POWER CONVERSION ARRAY APPLYING SMALL SEQUENTIALLY SWITCHED CONVERTERS IN PARALLEL

BACKGROUND OF THE INVENTION

1. Field of the Invention

The invention relates to the field of switched mode power converters and in particular to a high power, DC-to-DC converter utilizing a phased array of lower power converters operating in parallel.

2. Description of the Prior Art

Switched mode power converters accomplish various forms of power conversion through systematic switching and storage of electrical energy. A wide variety of circuit topologies are used to address many different power conversion requirements and applications. The regulation of the power conversion process is generally implemented through the control of one or more active switching devices.

Most circuit topologies used in DC-to-DC switched power mode converter technology use a control technique which monitors and samples one or more critical operating parameters, processes this parameterized information, and produces a single output which is used to drive a single active power switching device or several power switching devices which are connected in series or parallel. There are also several different topologies which use two control outputs to drive two or four active power switching devices.

Switched mode power conversion is commonly used because it is more efficient than linear regulation, which dissipates unused power as a primary method for regulation. Theoretically, if the switches and energy storage elements were lossless, that is lossless inductors and capacitors, switched mode power conversion would be 100 percent efficient. In reality, because components are not ideal and do exhibit loss, the efficiency is less than 100 percent, typically in the range of 75 to 95 percent depending on the circuit topology and the application.

Switched mode power conversion is also commonly used because as the switching frequency increases, the size and weight of the converter is reduced. This reduction in size and weight is due primarily to the frequency scaling properties of the energy's storage components.

One of the inherent shortcomings of switched mode power conversion becomes apparent in applications which require smaller sizes and higher frequencies. The smaller size requirements dictate that the switching frequency of the converter must be increased dramatically. Often, the increase in frequency goes beyond the most efficient operating range of the components available. Consequently, parasitic effects begin to dominate and losses increase, which cause a reduction in the conversion efficiency and a significant increase in the complexity of the circuit design. This relationship between size and frequency ultimately limits the size and efficiency of switched mode power converters.

Size and frequency limitations become even more significant as power level increases. This is because the larger components required to convert the high power levels generally exhibit a higher degree of parasitics, losses and nonideal behavior. In addition, these effects usually occur at lower frequencies when the size of the components increase. Therefore, it becomes more difficult to increase the switching frequency when the amount of power which must be converted increases.

Another problem which arises from the reduction in size and increase in frequency is the creation of high operating temperatures and hot spots. This is because of the lumped nature of the circuit topologies and also because the reduction in size is not accompanied with the corresponding reduction in losses or increases in efficiency. In fact, as mentioned above, the operating efficiency tends to decrease in this situation. Therefore, heat removal becomes a significant problem.

The use of parallel phase shifted DC-to-DC converters is known in the art. See Hergenhan, U.S. Pat. No. 4,290,101 "N Phase Digital Converter," (1981). However, in Hergenhan, the control circuit separately provide a sequential triggering pulse to each of the power switches in a manner to provide nonoverlapping control pulses as depicted in Hergenhan's FIG. 2.

The switching of flyback transformers to lower RMS values of ripple current through the input and output capacitors of a power conversion circuit is shown in Petersen, U.S. Pat. No. 4,972,292 "Inductor with Centertap Switching Transistor for Reduced Radio Frequency Emissions," (1990). Petersen, however, describes a four-switch array in which each of the switches are driven 90 degrees out of phase with respect to each other in a nonoverlapping relationship with varying duty cycles as shown in lines A and B of Peterson's FIG. 2a.

A parallel array of frequency converters for an AC power source is shown by Harada et al., "X-Ray Power Supply with Plural Frequency Converters," U.S. Pat. No. 5,105,351 (1992). However, although the primary coils of the switched transformers are in parallel, their secondary output circuits are ganged in series to provided a boosted up DC output voltage.

Inou et al., "DC/DC Converter," U.S. Pat. No. 4,685,039 (1987), describes a DC-to-DC converter having switched primaries coupled in series and secondary circuits coupled in parallel to the output capacitance and load. The embodiment of FIG. 7b of Inou shows three such circuits coupled in parallel between the input and output capacitances. Switching of the primary circuit in each circuit is either simultaneous as shown by Inou's FIG. 4a or 180 degrees out of phase as shown in FIG. 4b. No sequential phase shifting among a plurality of switched primaries is considered beyond the two modes.

Therefore, what is needed is some type of switched mode power converted topology and methodology by which each of the shortcomings relating to size and frequency limitations, particularly in a high power application, is avoided or reduced.

BRIEF SUMMARY OF THE INVENTION

What is described below is a high power switched mode power converter derived from an array of many lower powered converters, which are combined in such a way that the shortcomings which arise from the size and frequency limitations are overcome. More specifically, a plurality of lower powered converters are combined in such a manner that the currents flowing in the input and output capacitance in the converters are reduced. This results in the array of lower power converters exhibiting many of the benefits of high frequency operation while each individual converter in the array operates at a much lower frequency. This, in turn, allows the use of more standard components that are more efficiently utilized within their optimum operating ranges with fewer nonideal or parasitic effects. This technique becomes more attractive at even higher power levels because of the distribution in the array of the high power among several lower power converters. The power distribution also serves to distribute the losses evenly and avoids hot spots which are typically encountered in large lumped components which are operating at the upper end of their frequency capabilities and which exhibit higher losses and parasitic effects.

More rigorously the invention is a power conversion array comprising an input capacitance, an output capacitance, and a plurality of converters. Each converter has an input coupled in parallel to the input capacitance and an output coupled in parallel to the output capacitance. Each of the converters convert an input voltage to an output voltage using switched-mode power conversion. The plurality of converters operate at a conversion frequency and are phase shifted across one period of the conversion frequency so that each converter is switched on in a time overlapping relationship with at least one other one of the plurality of converters. As a result, input and output current and voltage ripple is substantially reduced, frequency of operation of the array increased, and power capacity increased.

In the illustrated embodiment the plurality of converters are phase shifted one from the other substantially uniformly across the period.

The plurality of converters comprises control circuit for sequentially phase shifting the plurality of converters across the period. The plurality of converters are N in number and the frequency of operation of each of the converters has a period T. Each of the plurality of converters is phase shifted from each other by a time increment of T/N. Each of the plurality of converters is switched on for a time period of Ton. The converters have an arbitrary circuit topology.

The power conversion array further comprises a control circuit and a clock circuit. The clock circuit generates a clock signal at the frequency of operation of the plurality of converters. The clock circuit is coupled to the control circuit. The control circuit provides a regulated control pulse to a delay circuit. The delay circuit generates a plurality of sequentially delayed switching pulses. The delay circuit is coupled to each of the converters to sequentially switch the converters with the switching pulses.

The delay circuit comprises a plurality of delay line modules coupled together in series, each delay line module providing a delayed trigger to initiate a next one of the delay line modules. Each delay line module in turn generates a plurality of delayed trigger signals. The delay line modules are coupled to selected ones of the plurality of converters to provide the phase delayed switched mode operation of the converters.

The delay line module comprises a multiple tap delay line circuit and the delay circuit comprises a corresponding plurality of multiple line drivers. Each of the drivers is coupled to a corresponding multiple of the converters to drive the converters on and off in response to the delayed trigger provided to the delay circuit.

The regulated control pulse generated by the control circuit is a pulse width modulated signal.

The invention is also characterized as a method of providing switched mode power conversion between an input capacitance and output capacitance. The method comprises the steps of providing an input power signal, and sequentially coupling the input power signal through a plurality of switched mode converters of arbitrary circuit topology coupled in parallel between the input and output capacitances. The input power signal is switched with an operating frequency having a period and is sequentially coupled through each of the plurality of switched mode converters by predetermined phase shifts of operation of each converter within the period in at least partially time overlapping relationship. An output power signal is provided at the output capacitance coupled in parallel with the outputs of the plurality of converters. As a result, high power operation at high frequency is obtained without frequency, size and temperature limitations.

The method further comprising the step of regulating each of the switched mode converters to provide a predetermined signal profile for the output power signal.

The step of sequentially coupling the input power signal through the plurality of switched mode converters comprises the steps of generating a plurality of switching signals through a cascaded delay, and switching each one of the plurality of switched mode converters with a corresponding one of the switching signals.

In the step of sequentially coupling the input power signal through the plurality of switched mode converters, the plurality of converters are operated in a time overlapping sequential series so that at no time are less than two of the converters providing an output to the output capacitance.

The invention may now be better visualized by turning to the following drawings wherein like elements are referenced by like numerals.

The invention and its various embodiments may now be understood in relationship to the following detailed description.

DETAILED DESCRIPTION OF THE PREFERRED EMBODIMENTS

Decreased input and output ripple current and ripple voltage on a switched mode power conversion array is realized at high power levels and frequencies by coupling an input power signal across an input capacitance to which a plurality of smaller power converter circuits are coupled in parallel. The converter circuits may have any topology now known or later devised. Each of the converter circuits are sequentially operated in a phase shifted manner across the period of the conversion frequency in a time overlapping relationship. For example, if there are N converters and the period of the conversion frequency is T, each converter circuit is triggered or switched at a phase shift corresponding to a time increment of T/N delayed with respect to the preceding or subsequent converter. The output of each of the converters is then coupled in parallel to an output capacitance. The operation of the converters may each be regulated in any manner now known or later devised and are shown in the illustrated embodiment as being pulse width modulated to provide a regulated output.

Figure 1:
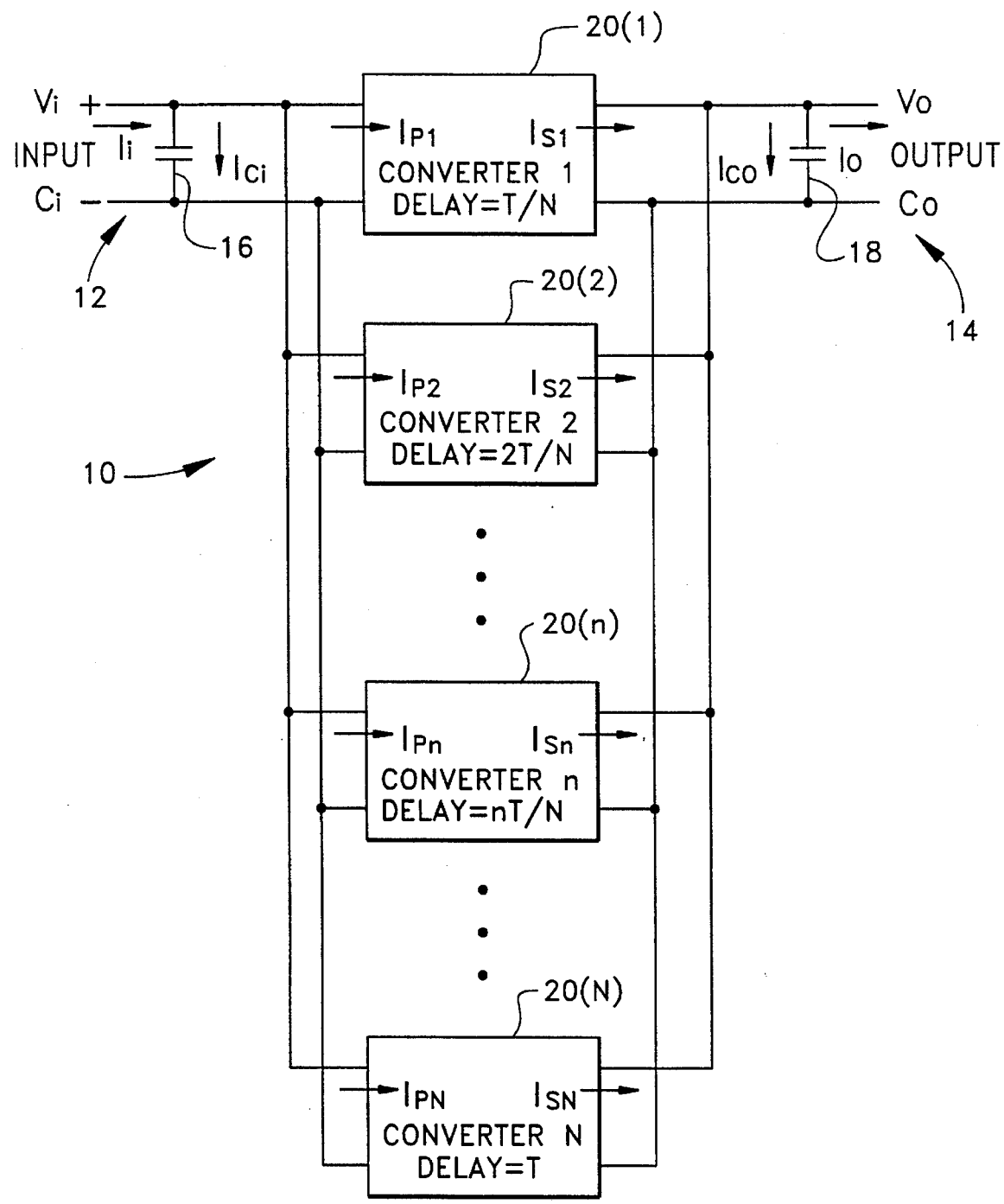
FIG. 1 is a block diagram of an N-phased switched mode power converter organized according to the invention.

FIG. 1 illustrates a simplified block diagram of an N-phase, switched mode, power converter organized according to the invention. An input voltage Vi is provided at the double-railed input 12 and an output voltage Vo is produced at the double-railed output 14. Voltages Vi and Vo are either DC or slowly varying as compared to the switching frequency within converter 10. The input current at input 12 is Ii and the output current at output 14 is Io. The input and output capacitances of converter 10 are schematically depicted as input capacitance 16, Ci, and output 18, Co. The input and output capacitance 16 and 18, respectively, are used to stabilize the input and output voltages to accept the high frequency switching currents of the N converters 20(1)–20(N) which are used to form power processing array 10.

The input and output switching currents of converters 20(n) are denoted in FIG. 1 as the current Ipn and Isn, respectively, where n=1, 2, ... N. Converters 20(n) are each sequentially time delayed or phase shifted by an interval T/N with respect to the preceding converter 20(n-1) in array 10 so that the switching and storage of energy is spread evenly over the switching period, T.

Figure 4:
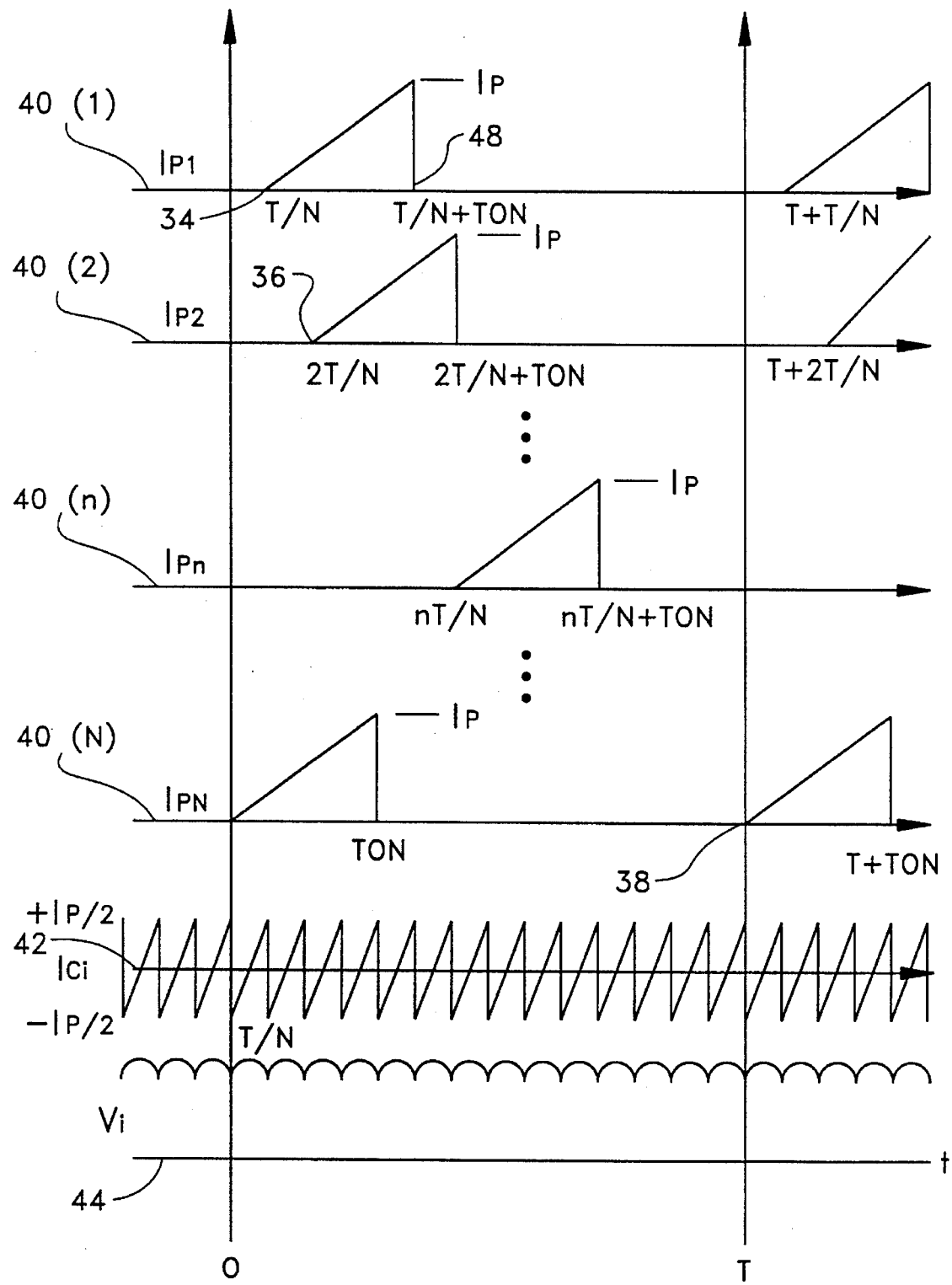
FIG. 4 is a timing diagram showing the current wave forms in the primaries of the transformers depicted in FIG. 2.
Figure 5:
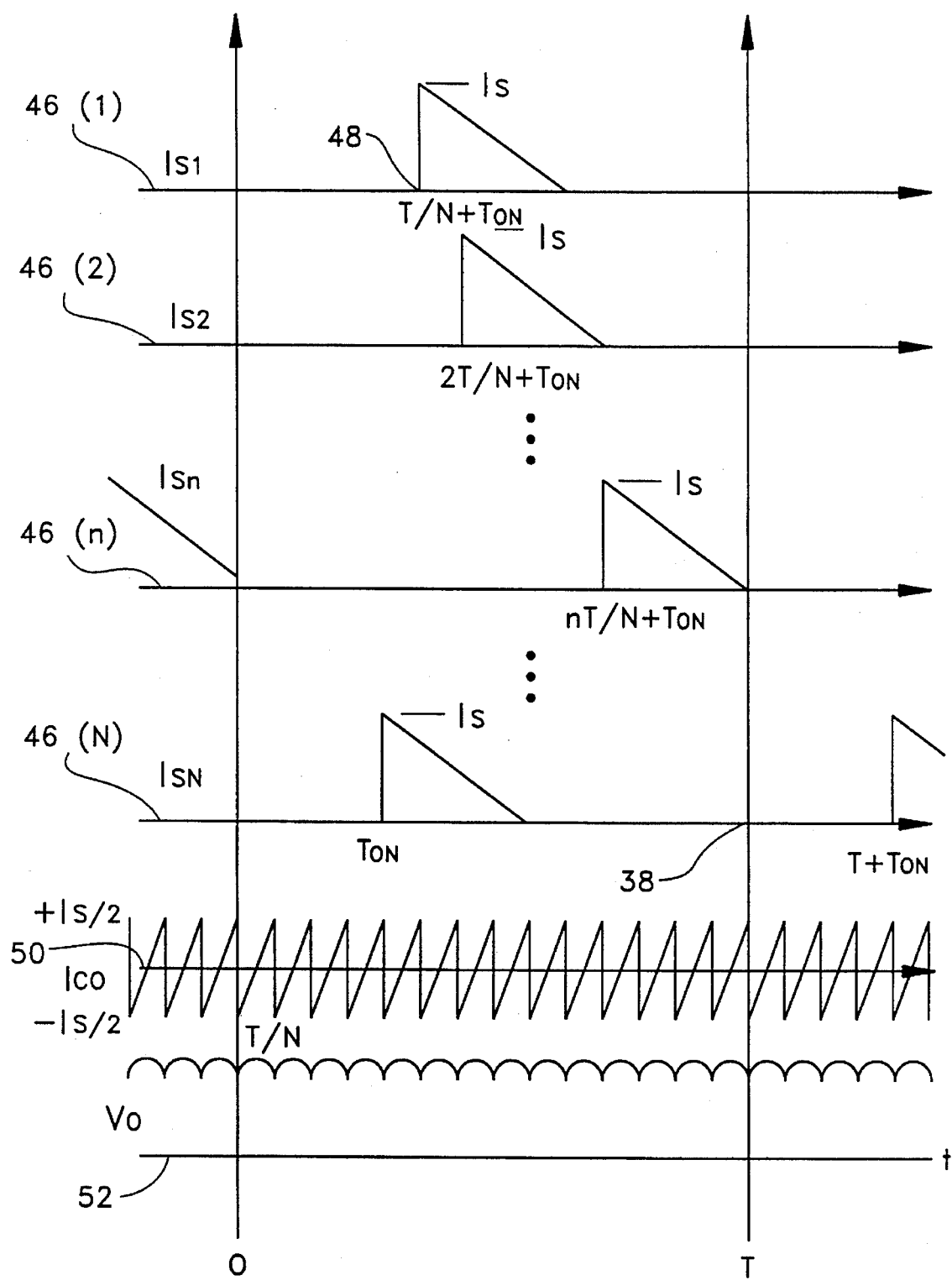
FIG. 5 is a timing diagram showing the current wave forms in the secondaries of the transformers depicted in FIG. 2.

In comparison to the case of a single converter or multiple converters in phase, the resulting input and output ripple currents, Ici and Ico shown in FIGS. 4 and 5, respectively, are significantly reduced and periodic with a period of T/N. The corresponding ripple voltage appearing across capacitances 16 and 18 are reduced even more significantly as a result of both the reduced ripple currents and increased frequency.

It can be shown mathematically that reduction of input and output capacitance ripple currents and voltages apply to any physically realizable switched-mode power converter circuit topology. The degree of reduction is a function of converter input and output currents, Ipn and Isn, and the number of converters, N, utilized in array 10. In general, the reductions are more significant as the number of converters, N, increases and as the AC component of the converter currents increase relative to the DC component.

Figure 2:
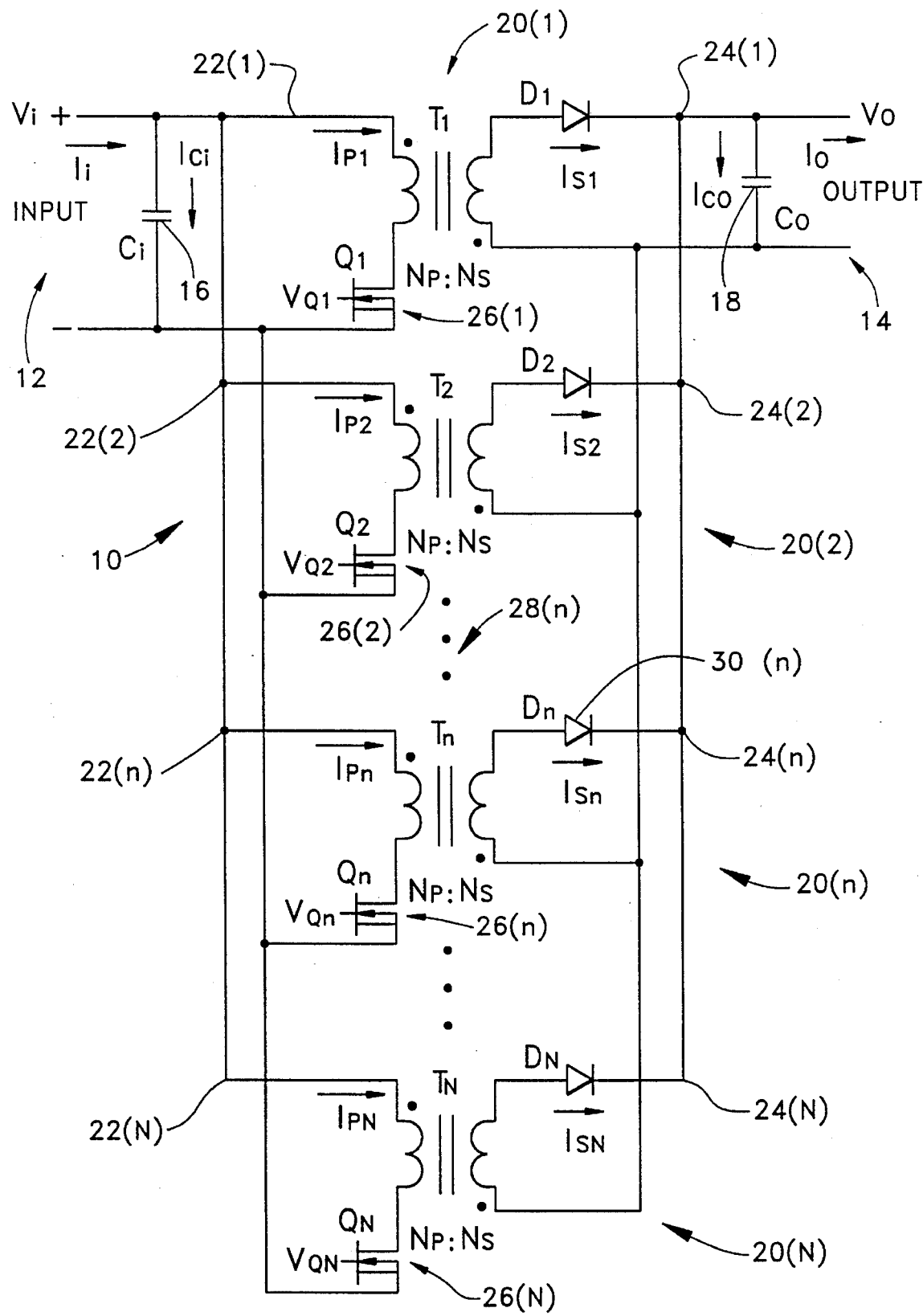
FIG. 2 is simplified and idealized schematic of one embodiment more specifically illustrating the switched mode power converter of FIG. 1.

Consider one specific example of the circuit topology of FIG. 1 as shown in the simplified schematic of FIG. 2. The schematic of FIG. 2 shows a phased array of N identical switched mode power converters 20(1)–(N) utilizing a flyback topology and operating in a discontinuous conduction mode. It must be understood that any other type of converter topologies may be used without departing from the spirit and scope of the invention. Inputs 22(1)–(N) and outputs 24(1)–(N) of converters 20(1)–(N) respectively are coupled in parallel to form a single input 12 and output 14 for the overall combined converter array 10.

Consider one of the converters, converter 20(n) for example. Each converter 20(n) has an active switch 26(n) which are shown in the illustrated embodiment as MOS FETs, but any suitable active switch can be used. Switch 26(n) switches current through a transformer 28(n), Tn. The output of transformer 28(n) is coupled through a diode 30(n). Transformers 28(n) have NP primary turns and NS as secondary turns. For the ease of discussion it is assumed for the purposes of the present discussion that all components are ideal and lossless, although this is certainly not a necessary condition for the circuitry of the invention.

Figure 3:
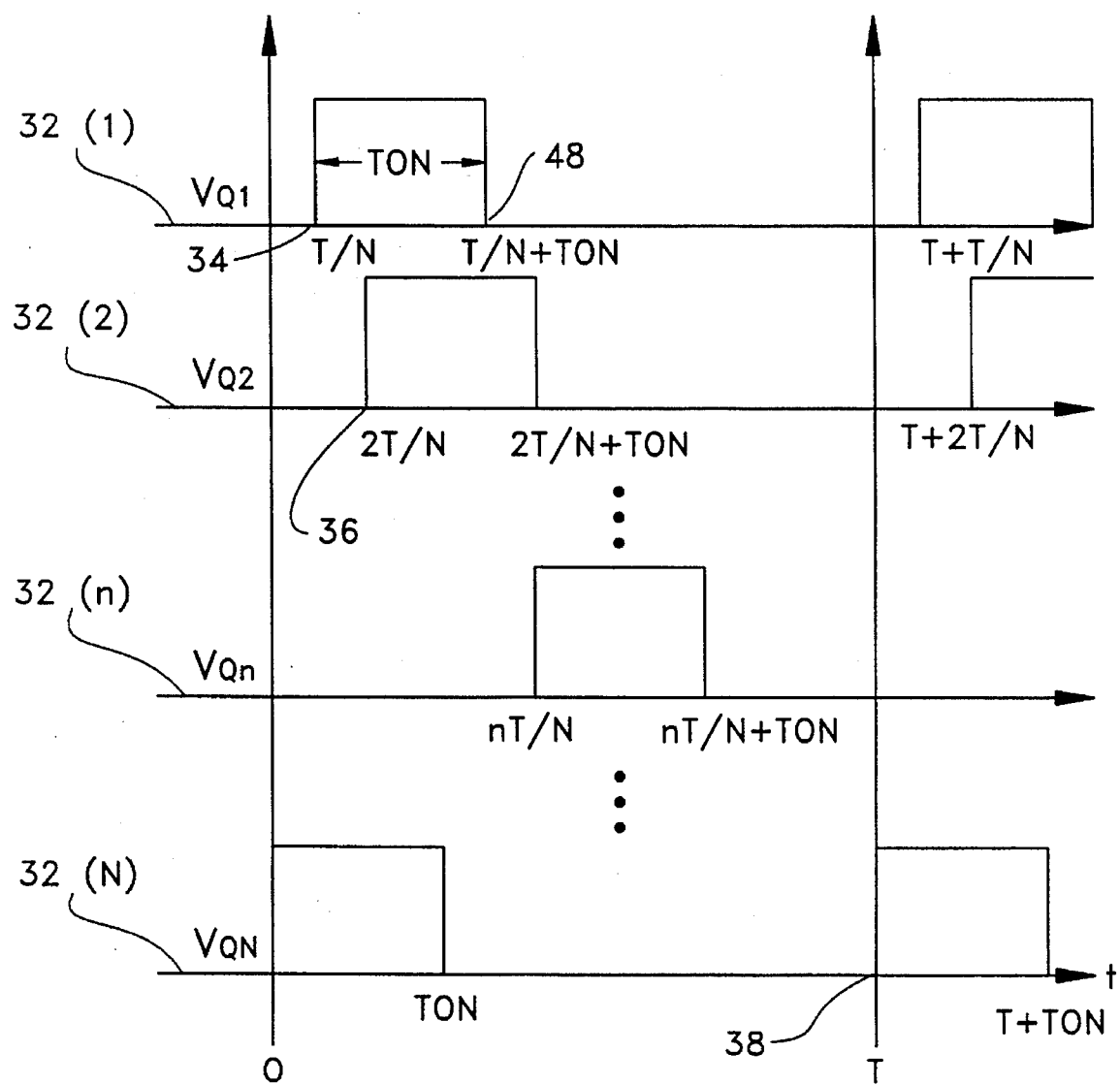
FIG. 3 is timing diagram showing the wave forms for the drive signals applied to the gates of the switching devices in FIG. 2.

Primary switches 26(n), Qn, are driven by separate drive signals as depicted in the timing wave form diagram of FIG. 3. The horizontal axis represents time and the vertical axis represents voltage, which on lines 32(1)–(N) correspond to the voltage applied to the gage of each of the switches 26(1)–(N) respectively. The drive pulse for first switch 26(1) begins at an arbitrarily chosen time 34, t=T/N with a pulse width of Ton. The drive pulse shown on line 32(2) of FIG. 3 for the second active switch 26(2) of converter 20(2) is identical to the drive signal provided to the first switch as shown on line 32(1) except that it is delayed or phase shifted by a time of T/N and, thus, begins at a time 36 of 2 T/N.

The drive pulses on the remaining switches 26(n) shown on lines 32(n) in FIG. 3 are also identical to pulse on line 32(1) except that each is successively delayed by an additional time increment, T/N from the preceding switch. The last drive pulse on line 32(N) driving switch 26(N) of converter 20(N) is, therefore, delayed by total time increment of (N-1)T/N with respect to the initial timing point 34 and, thus, actually begins at the next time period 38 as shown in FIG. 3.

This phase shift of the driving signals results in an overall converter energy processing frequency of N/T, which is N times the operating frequency of each individual converter. Note that only one unique drive signal is provided throughout converter array 10, which drive signal is pulse-width regulated in the illustrated embodiment to control converter array 10. This signal is then internally phase shifted within converter array 10 to provide the drive for each of the individual converters in array 10.

Advantages of the circuit of FIG. 2 when driven with the phase shifted drive signals of FIG. 3 is illustrated in the primary current wave form timing diagram of FIG. 4 and the secondary current wave form timing diagram of FIG. 5. Consider first the timing diagram of FIG. 4. The primary current Ipn flows in the phased array of N flyback converters 20(N) as depicted on lines 40(1)–(N) in FIG. 4. Time is again shown on the horizontal axis with current depicted in the vertical axis. Primary current, Ipn, flows in each converter 20(n) when its respective drive pulse, Vqn, is high. The current ramps up linearly to a peak current, Ip, according to the input voltage, Vi, the primary inductance of transformer 28(n), Tn, and the conduction time, Ton. The conduction times are all equal to Ton corresponding to the identical pulse width of the drive pulses. The total input current to the converter array 10, Ii, is equal to the sum of the DC components of all the converter primary currents, Ipn. The input capacitor ripple current, Ici is equal to the total input current minus the sum of all the converter primary currents, Ipn. Note that the peak-to-peak current is only equal to Ip, which is the same for each converter 20(n). If all of converters 20(n) were switched in-phase or if they were replaced by a single converter, this peak-to-peak input capacitor ripple current would be N times larger, i.e. NIp. The phase shifting of the converters 20(N) causes the primary currents to sum in a way that yields a peak-to-peak input capacitor current which is lower by a factor equal to the number of converters, N. A corresponding reduction occurs for the input capacitor RMS ripple current. The magnitude of this reduction is on the order of N, however, it also varies as a function of the conduction time, Ton. The ripple current, Ici, is shown in line 42 of FIG. 4. The frequency of the input capacitor ripple current is thus illustrated as N times the operating frequency of each of the individual converters 20(n).

Also shown in FIG. 4 on line 44 is the input ripple voltage which results from the ripple current flowing through input capacitor 16. This voltage consists of the usual DC input component plus an additional AC component caused by the input capacitor ripple current. Simple analysis yields that both the peak-to-peak and RMS input capacitor ripple voltages are lowered by a factor of the order of $N^2$ as compared to the case of a single converter or when multiple converters are driven in-phase. One factor of N in the reduction results from the reduction in the ripple current itself. The other factor of N in the reduction of the ripple voltage results from the increase in frequency seen at input capacitor 16. The reduction occurs regardless of the form of the input waveform and hence the topology of the conversion circuit.

Figure 7:
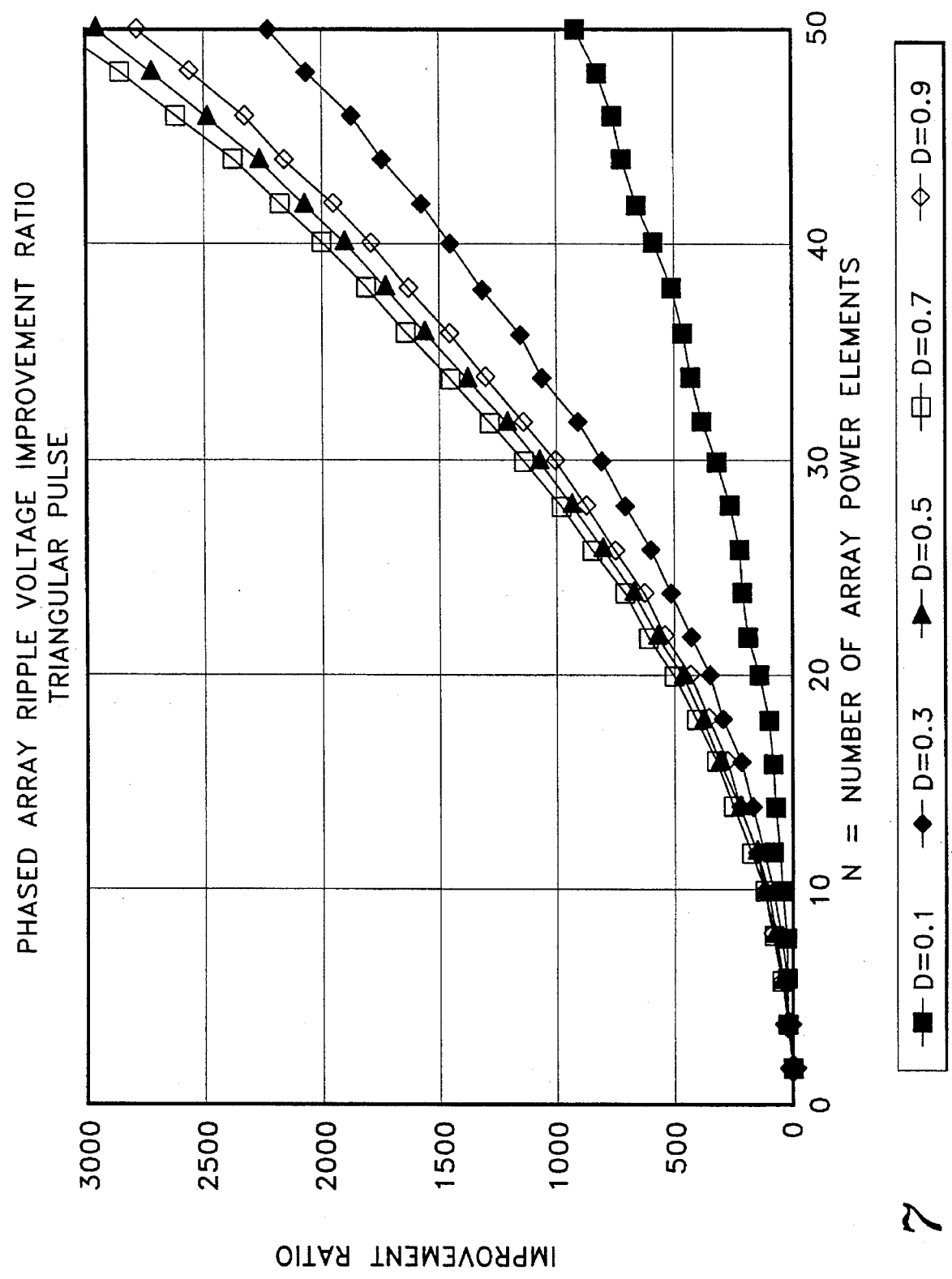
FIG. 7 is a graph of the improvement ratio of AC voltage ripple from a conversion array of the invention having a triangular output waveform as compared to the AC ripple from a conversion array in which the same number and type of converters are driven in phase.
Figure 8:
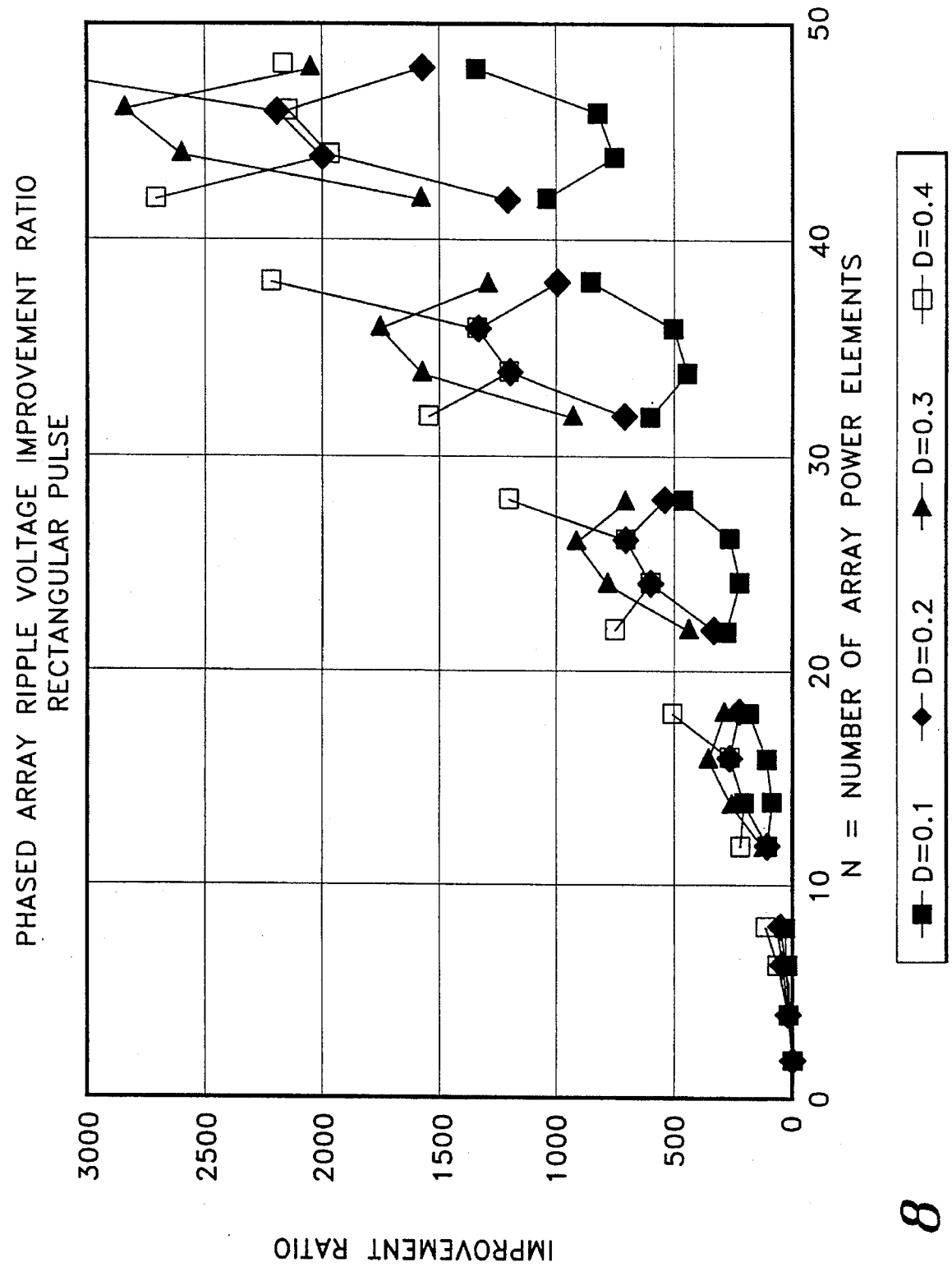
FIG. 8 shows the improvement ratio of AC voltage ripple in a conversion array of the invention having a rectangular output waveform as compared to the AC ripple from a conversion array in which the same number and type of converters are driven in phase.

FIG. 7 is a graph of the improvement ratio of AC voltage ripple from a conversion array having a triangular output waveform when driven in a phase shifted sequence according to the invention as compared to the AC ripple from a conversion array in which the same number and type of converters are driven in phase as a function of duty cycle, D, and the number of converters in the array. This is defined as the improvement ratio. FIG. 8 shows the improvement ratio of AC voltage ripple in a conversion array having a rectangular output waveform when driven in a phase shifted sequence according to the invention as compared to the AC ripple from a conversion array in which the same number and type of converters are driven in phase as a function of duty cycle, D, and the number of converters in the array. The reduction in AC current is analgous to that shown for ripple voltage. It is evident from FIGS. 7 and 8 that ripple is always reduced and is reduced as a function of duty cycle, D, the number of converters, N, and the form of the converter output waveform.

FIG. 5 similarly illustrates the current in the secondaries Isn of transformers 28(n). The secondary currents are shown on lines 46(1)–(N) with a secondary current in each converter circuit 20(n) beginning at the turn off time 48 of the primary current shown in FIG. 4 and ramping down linearly over a pulse width of Ton. Thus, each secondary current is phase shifted from the preceding one by the same time increment of T/N. An analog output capacitor ripple current, Ico, is depicted on line 50 having a frequency N times greater than the frequency of each individual converter. Similarly, an output voltage is shown on line 52 of FIG. 5 with an AC ripple component which is reduced by a factor of the order of $N^2$ compared to a single converter or a plurality of in-phase converters.

These reductions in input and output capacitor ripple currents and voltages become large as N increases. Conversely, for a fixed ripple current and voltage requirement, the amount and quality of input and output capacitance decreases significantly as N increases.

Figure 6:
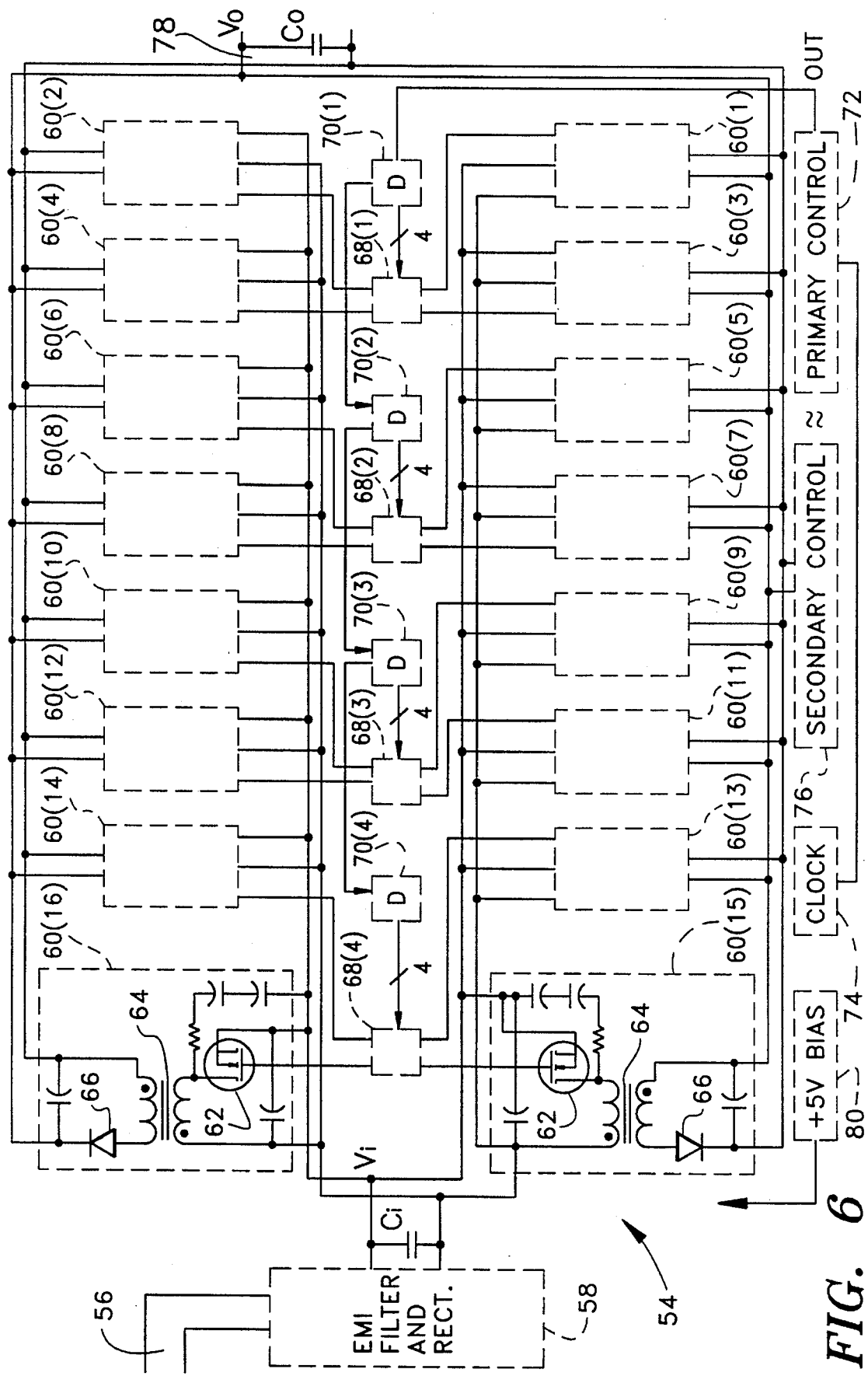
FIG. 6 is a block diagram of a second embodiment of the invention.

FIG. 6 is a block diagram of a second embodiment of the invention wherein a 300 watt isolated power factor correction front end, generally denoted by reference numeral 54, is diagrammatically shown. The AC input, or at least slowly varying input 56 compared to the switching frequency of circuit 54, is input into an electromagnetic interference (EMI) filter and rectifier 58 which filters the EMI and rectifies the AC input. The filtered DC input is then provided in parallel to sixteen switched mode power circuits 60. Each of these power circuits 60 are comprised of a MOS FET switch 62, transformer 64, secondary diode 66 and associated capacitors and resistors as depicted in FIG. 6. However, any converter topology could be used in connection with the present invention and the one depicted in FIG. 6 is chosen only for concreteness of illustration.

MOS FETs 62, in turn, are driven by MOS FET drivers 68. In the illustrated embodiment, MOS FET drivers 68 are integrated circuit CMOS quad drivers (TC4469COE). Each driver 68 provides the driving signal to the MOS FETs 62 in four corresponding converters 60.

MOS FET drivers, in turn, are triggered by a sequential chain of delay line circuits 70, which in the illustrated embodiment are five tap delay line circuits (DS1000S-500). The first one of the delay line circuits 70 is controlled by a signal, OUT, provided by a conventional pulse-width modulated (PMW) primary control circuit 72. PMW primary control circuit 72, in turn, is driven by a clock 74 which divides down a 5 MHz signal by 16 to 312.5 kHz. Thus, pulses are provided from primary control circuit 72 every 3.2 microseconds with a pulse width as determined by a conventional secondary control circuit 76, which is optically coupled to primary control 72. Secondary control circuit 76 obtains a feedback signal from output 78. Each of delay line circuits 70 effectively provide 200 nanosecond separated delayed pulses to its corresponding MOS FET driver 68 which in turn drives in sequence the four converter circuits 60 coupled to it. For example, delay line circuit 70(1) provides four delay signals at 0, 200, 400 and 600 nanosecond delays phase shifted from the signal OUT to MOS FET driver 68(1). MOS FET driver 68(1) in turn will sequentially drive converter circuits 60(1)–60(4) to turn on at 0, 200, 400 and 600 nanoseconds after the trigger signal, OUT, and stay on for a pulse width as provided by primary control circuit 72 on the signal OUT. However, by the time that 800 nanoseconds has been reach, second delay line circuit 70(2) will be triggered and will similarly provide four 200-nanosecond delay signals to second MOS FET driver 68(2). In the same manner, converters 60(5)–(8) will also be sequentially driven on at 200-nanosecond time increments beginning 800 nanoseconds after initiation of the pulse, OUT, from primary control circuit 72.

In the same manner, all sixteen converter circuits 60 will be sequentially driven on for a time determined by the pulse width generated by primary control 72 during a 3.2 microsecond cycle period defined by clock 74. Because in the illustrated embodiment, a five tap delay line 70 is used the actual implementation is not as depicted in FIG. 6, but six such delay line circuits are utilized to effectively perform the function described with respect to the four delay line circuits 70 in FIG. 6 to provide the sixteen 200-nanosecond delayed trigger pulses to the respective MOS FETs drivers 68 as described.

The invention has been described in connection with two specific embodiments but is applicable to any switched mode power converter circuit topology which converts one level of DC voltage to another level of DC voltage and which utilizes input and/or output capacitors. The invention, however, is not limited to DC-to-DC converters, but is applicable wherever the input and output voltages vary at a frequency which is slow compared to the operating frequency of the converter. An example of this type of application is in power factor correction circuit where an input voltage varies slowly with line frequency.

The invention is applicable in both fixed and variable frequency control techniques as long as the drives to the array of N converters remain phase shifted by an increment, such as T/N, as the frequency varies. The invention can be used in both pulse width modulated circuitry as shown in FIG. 6 and in resonant circuit topologies.

The invention is fully applicable in both isolated and nonisolated circuit topologies. Further, it is not necessary that the phase shift remain constant, but it is within the scope of the invention that the phase shift could be varied on a real time basis as a function of or independently from variations in the frequency of conversion depending upon the application at hand and the advantages which are sought.

The advantages of the invention can now be understood. These advantages include but are not limited to:

1. Reduced converter size for a given power level and operating frequency; equivalently, an increased power density with 100 watts per cubic inch or higher easily being achievable in the converter;

2. Optimum thermal characteristics including even heat dissipation, a maximized surface area for a given volume, fewer and cooler hot spots and reduced requirements for heat sinks;

3. Improved reliability as a result of lower operating temperature, fewer hot spots and potential built-in redundancy;

4. Feasibility of 100 percent utilization of automated manufacturing techniques, including surface mount technology, because power is processed in smaller amounts within each converter, therefore, leading to significantly reduced manufacturing costs;

5. Reduction in the number of types of components used, thereby, promoting standardization and lowering overhead costs;

6. Reduction in material content and cost due to more efficient utilization of material and higher volume pricing;

7. Low profile converters for use in new applications, typically contemplating converters 0.25 inch thick and thinner;

8. Improved electromagnetic interference characteristics due to distributive nature of EMI sources, reduced ripple voltage and higher ripple frequencies which are easier to filter;

9. Realization of the advantages of high frequency operation in power converters without the corresponding disadvantages;

10. Utility in a wide variety of applications, converter topologies, input voltages and output voltages;

11. Ease of standardization via standardized power and control elements or modules thereby reducing time to market, development costs, material costs and overhead costs in connection with product introduction;

12. Power capability is easily scaled in the designs of the invention by varying the number and size of the individual power elements in the array; and 13. Input and output capacitance requirements of the circuits can be reduced by many orders of magnitude consistent with the teachings of the invention.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following claims. The following claims are, therefore, to be read to include not only the combination of elements which are literally set forth, but all equivalent elements for performing substantially the same function in substantially the same way to obtain substantially the same result. The claims are thus to be understood to include what is specifically illustrated and described above, what is conceptionally equivalent, and also what essentially incorporates the essential idea of the invention.

I claim:

1. A power conversion array comprising:

an input capacitance;

an output capacitance;

a plurality of converters, N in number, each having an input coupled in parallel to said input capacitance and an output coupled in parallel to said output capacitance, each of said converters for converting an input voltage to an output voltage using switched-mode power conversion, each of said plurality of converters operating at a conversion frequency having a period of T, and being phase shifted from each other by a time increment T/N so that each converter is switched on in a time overlapping relationship with at least one other of said plurality of converters;

whereby input and output current and voltage ripple is substantially reduced, frequency of operation of said array increased, and power capacity increased.

2. The power conversion array of claim 1 wherein each of said plurality of converters is switched on for a time period of Ton.

3. A power conversion array comprising:

an input capacitance;

an output capacitance;

a plurality of converters each having an input coupled in parallel to said input capacitance and an output coupled in parallel to said output capacitance, each of said converters for converting an input voltage to an output voltage using switched-mode power conversion, said plurality of converters operating at a conversation frequency and being phase shifted across one period of said conversion frequency so that each converter is switched on in a time overlapping relationship with at least one other of said plurality of converters; and a control circuit and a clock circuit, said clock circuit generating a clock signal at said frequency of operation of said plurality of converters, said clock circuit being coupled to said control circuit, said control circuit providing a regulated control pulse to a delay circuit for generating a plurality of sequentially delayed switching pulses and coupled to each of said converters to sequentially switch said converters with said switching pulses;

whereby input and output current and voltage ripple is substantially reduced, frequency of operation of said array increased, and power capacity increased.

4. The power conversion array claim 3 wherein said delay circuit comprises a plurality of delay line modules coupled together in series, each delay line module providing a delayed trigger to initiate a next one of said delay line modules, each delay line module in turn generating a plurality of delayed trigger signals, said delay line modules being coupled to selected ones of said plurality of converters to provide said phase delayed switched mode operation of said converters.

5. The power conversion array claim 4 wherein said delay line module comprises a multiple tap delay line circuit and said delay circuit comprises a corresponding plurality of multiple line drivers, each said driver being coupled to a corresponding multiple of said converters to drive said converters on and off in response to said delayed trigger provided to said delay circuit.

6. The power conversion array of claim 3 wherein said regulated control pulse generated by said control circuit is a pulse width modulated signal.

7. A method of providing switched mode power conversion between an input capacitance and output capacitance comprising the steps of:

providing an input power signal;

sequentially coupling said input power signal through N switched mode converters coupled in parallel between said input and output capacitances;

generating a plurality of switching signals through a cascaded delay, and sequentially switching each one of said plurality of switched mode converters with a corresponding sequence of said switching signals, said input power signal being switched with an operating frequency having a time interval period T and being sequentially coupled through each of said N switched mode converters by the resulting predetermined phase shifts of operation of each converter within said period at intervals of T/N in at least partially time overlapping relationship; and providing an output power signal at said output capacitance coupled in parallel with said outputs of said plurality of converters, whereby high power operation at high frequency is obtained without frequency, size and temperature limitations.

8. A method of providing switched mode power conversion between an input capacitance and output capacitance comprising the steps of:

providing an input power signal;

sequentially coupling said input power signal through N switched mode converters coupled in parallel between said input and output capacitances;

generating a plurality of switching signals through a cascaded delay, and sequentially switching each one of said plurality of switched mode converters with a corresponding sequence of said switching signals, said input power signal being switched with an operating frequency having a period and being sequentially coupled in the same sequence to the output capacitance in response to the outstanding signals through each of said plurality of switched mode converters by the resulting predetermined phase shifts of operation of each converter within said period in at least partially time overlapping relationship; and providing an output power signal at said output capacitance coupled in parallel with said outputs of said plurality of converters, whereby high power operation at high frequency is obtained without frequency, size and temperature limitations.

* * * * *